United States Patent [19]
Oliver

[11] Patent Number: 6,158,606
[45] Date of Patent: Dec. 12, 2000

[54] PRESSURE SETTING VALUE FOR A PRESSURE-COOKER

[75] Inventor: JoséLuis Oliver, Mondragon, Spain

[73] Assignee: Fagor, S. Corp., Mondragon, Spain

[21] Appl. No.: 09/448,919

[22] Filed: Nov. 23, 1999

[30] Foreign Application Priority Data

Dec. 7, 1998 [ES] Spain .................................. 9803104 U

[51] Int. Cl.[7] ................................................ A47J 27/092
[52] U.S. Cl. .............................. 220/203.04; 220/203.27; 220/203.29; 220/DIG. 16; 99/343; 126/388; 126/389; 137/556; 137/557
[58] Field of Search ...................... 220/203.04, 203.23, 220/203.27, 203.29, 316, 367.1, 373, 912, DIG. 16; 126/388, 389; 99/342, 343; 137/556, 557, 529, 530, 532; 116/266, 270, 272

[56] References Cited

U.S. PATENT DOCUMENTS

| | | | |
|---|---|---|---|
| 4,370,999 | 2/1983 | Sebillotte | 137/532 X |
| 4,461,452 | 7/1984 | Krejza | 137/556 X |
| 5,135,121 | 8/1992 | Javier | 220/367.1 X |
| 5,265,522 | 11/1993 | Schultz | 99/343 |
| 5,507,311 | 4/1996 | Combe | 220/203.04 X |
| 5,678,721 | 10/1997 | Cartigny et al. | 220/316 |
| 6,019,029 | 2/2000 | Chan | 220/912 X |

FOREIGN PATENT DOCUMENTS

| | | |
|---|---|---|
| 2545541 | 4/1977 | Germany . |
| 3027027 | 2/1982 | Germany . |
| 3630584 | 3/1988 | Germany . |

*Primary Examiner*—Nathan J. Newhouse
*Attorney, Agent, or Firm*—The Kline Law Firm

[57] ABSTRACT

The cooking pressure setting valve (1) for a pressure cooker (2, 3) comprises a setting knob (6) housed in the radial handle of the cooker lid (3), an outer casing (5) covered by the setting knob (6), a central valve body (10) provided with a cap disc (19) for sealing with the setting knob, a valve seat (9) an a valve member (8) with a axial central hole in communication with a diaphragm (18), a pressure regulating spring (11), an axial pressure indication stem (15) pushed by the diaphragm and guided by cap disc, and a pivoting spherical shell (16) jointed to the axial stem and visible from the outside of the setting knob.

2 Claims, 1 Drawing Sheet

6,158,606

PRESSURE SETTING VALUE FOR A PRESSURE-COOKER

The present invention relates to the control and safety devices of a domestic pressure cooker.

PRIOR ART

ES-2016309 (EP-259578-A) describes a valve for setting the pressure inside the cooker, which is partly inserted into a hole in the cooker lid and protrudes therefrom. It is constructed with a cylindrical casing that houses a valve body pressed by a rated coaxial spring against the cooker steam pressure, the casing being detachable from the valve body. This contains a pressure indicator, which is cylindrical and is forced by the steam pressure through an elastic diaphragm in communication with the inside of the cooker vessel, against the reaction of a coaxial spring which encircles it and rests on a cap connected to the valve body.

A known valve for regulating the pressure in a pressure cooker, like that described in DE2547004, has an axial pressure indicator stem that protrudes to the exterior. The helical spring for regulating the pressure is pretensioned by a device, irrespective of the position of the valve sealing member on the valve seat. The spring rests against a rotary surface connected to the valve setting knob, and the rotary surface has a shoulder that follows a cam ramp configured on an internal face of the setting knob for the axial advance of a bush, which compresses the spring in accordance with the position of the setting knob. The regulating spring is guided on a central tubular body. The indicator stem is pushed by a sealing diaphragm, which at the same time stops particles passing from the cooker to the inside of the valve.

Pressure indicators constructed with a metal stem have pressure indicator marks at their free end, which have to protrude from the valve setting knob in order to be visible. In addition, stem indicators of this type housed in a central valve body have to be guided in their upward movement, which is relatively long, passing with a snug fit through a seal that keeps the indicator housing free from external dirt particles that could interfere with its lifting action.

DISCLOSURE OF THE INVENTION

The object of the present invention is a pressure cooker pressure setting valve, provided with means for regulating the pressure, means for indicating the pressure, and means for sealing so as to prevent the entry of particles and dirt both from inside and outside the cooker, as defined in claim 1.

The valve according to the invention is constructed with different moulded parts of varying diameter tubular configuration for telescopic assemblage, connected to one another without screw threads and where they encounter their relative position by means of simple diametral stops for locating and retaining in the axial direction.

The setting valve has a pressure indicator in the form of a spherical shell sector, which is pivoting and does not stand proud of the setting knob. The latter has a transparent central ridge with an arched contour, covering the interior of the valve without any opening to the exterior. When the pressure setting is reached, the indicator shell sector, which is coloured, pivots and positions itself under the transparent central area of the setting knob.

DETAILED DESCRIPTION OF THE INVENTION

Figure 1:
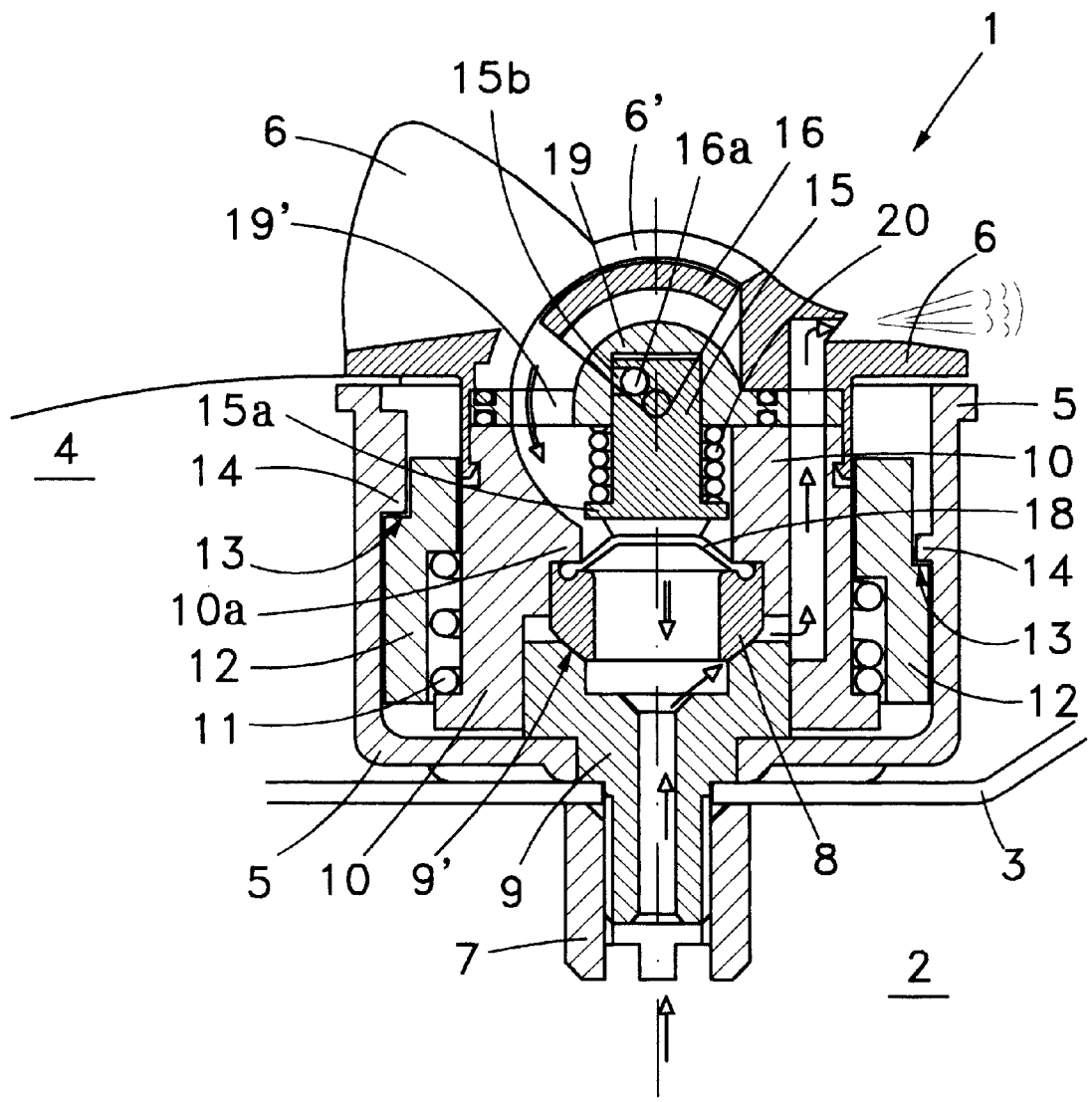
FIG. 1 is a sectional view of the pressure setting valve according to the invention.

With reference to FIG. 1, the preferred embodiment of the pressure setting valve 1 for a pressure cooker 2 is inserted in a hole in the cooker lid 3 and concealed inside the cooker handle 4, with only the setting knob protruding from it. Valve 1 comprises an outer casing covered by the setting knob 6, a cylindrical valve body 10 and a hollow recess inside the casing 5, valve parts 8 and 9 housed inside the valve body 10, a regulating spring 11, a spring pretensioning bush 12 connected to the setting knob 6, a pressure take-off 7 communicating the seal 8 with the interior of the cooker vessel 2, and a pressure indicator 15, 16.

The valve parts are a sealing member 8 with a frusto-conical sealing end, and a bevelled valve seat 9 with a valve hole overlaying the pressure take-off 7 coaxially. The setting knob 6 is rotary and takes up various angular positions corresponding to different cooking pressure values, ranging between fully open, for emptying the vessel, and a maximum cooking pressure value, to which FIG. 1 refers. The valve body 10 is connected at the top to the setting knob by means of retaining hooks, and at the bottom it pushes the seal 8 against the valve seat 9. The valve body 10 also contains the steam release according to the arrows in FIG. 1, issuing under an aperture in the setting knob 6.

The regulating spring 11 is supported by the valve body, which has an annular shoulder 10a resting on the seal 8 and pushing it down to hold it against the seat 9. The spring 11 is encircled by regulating bush 12, which turns with the setting knob 6 to tension the spring 11. The outer surface of the tensioning bush 12 has a spiral step, which comes up against two shoulders 14 on the inner face of the casing 5, retaining the bush 12 against the expansion force of spring 11. Step 13 is like a cam ramp traversed by the casing shoulders 14, which establishes the different positions of bush 12 in the axial direction. To regulate the cooking pressure, as it turns, the setting knob 6 draws with it both the valve body 10 and the bush 12, the latter advancing coaxially to compress the spring 11 to a pre-set tension, so that the seal 8 overcomes the tension of spring 11 and rises once the cooking pressure has been reached.

Indicator 15, 16 is also housed in the valve body 10, fitted on sealing member 8, which is perforated and in contact with a diaphragm 18 attached to the seal 8, by way of which it communicates with the pressure take-off 7. Indicator 15, 16 comprises an axial stem 15, with a base 15a in contact with the diaphragm 18 for its raising, and the pressure indicator pivoting spherical shell sector 16. Round the outside the indicator axial stem 13 has an open groove 15b where it supports the pivot pin 16a, with the configuration of a crank connected to the two ends of the spherical shell sector 16, so that in its upward travel the indicator stem 15 pushes the pin 16a, forcing the coloured spherical shell 16 to pivot until it is lined up with the transparent surface 6' of the setting knob.

The hollow valve body 10 where the indicator 15, 16 is housed has a disc-shaped sealing cap 19 with a central ridge to make room for the axial stem 15 in its movement, and a slot 19' to let the spherical shell 16 pass in its movement towards the surface of the setting knob 6. The indicator 15, 16 is restored to its "no pressure" position under the action of a return spring 20, which encircles the axial indicator stem 15 and rests against the valve cap disc 15.

What is claimed is:

1. Cooking pressure setting valve for a pressure cooker having a cooking vessel and a lid, comprising
    a rotary valve setting knob housed on a radial handle superimposed on the cooker lid, to graduate the pressure inside the vessel, an outer valve casing on top of the cooker lid covered by the setting knob, and a cylindrical central valve body housed in the outer casing and connected rotationally to the setting knob, a pressure take-off, which traverses a hole in the cooker lid communicating the vessel with the valve, means for the tight sealing of the valve body with the setting knob, a valve seat and a valve sealing member with a central hole, which lifts off the valve seat for steam release, a pressure regulating spring, pretensioned by means of turning the setting knob, which keeps the sealing member closed until a set pressure is exceeded, means for the pressure indication, housed in the central body, comprising a diaphragm connected to the vessel pressure take-off by way of the sealing member, an axial stem pushed by the diaphragm, an axial stem return spring, and a pivoting spherical shell jointed to the axial stem and visible from the outside of the setting knob.

2. The pressure setting valve of claim 1, wherein the setting knob has a transparent outer surface covering said pivoting pressure indicator and said means for tight sealing are a cap disc which guides the means for indication in their movement under the outer surface of the setting knob.

* * * * *